United States Patent Office 3,489,455
Patented Jan. 13, 1970

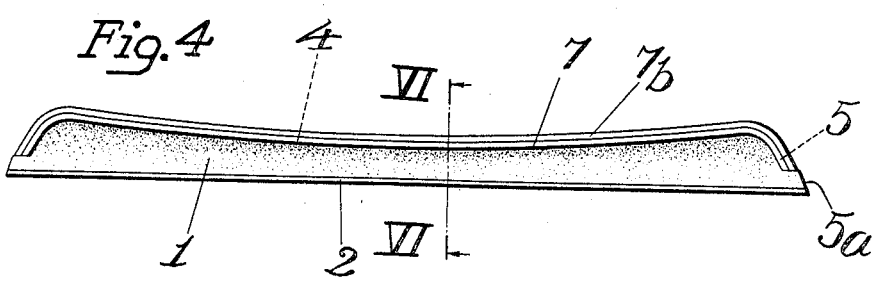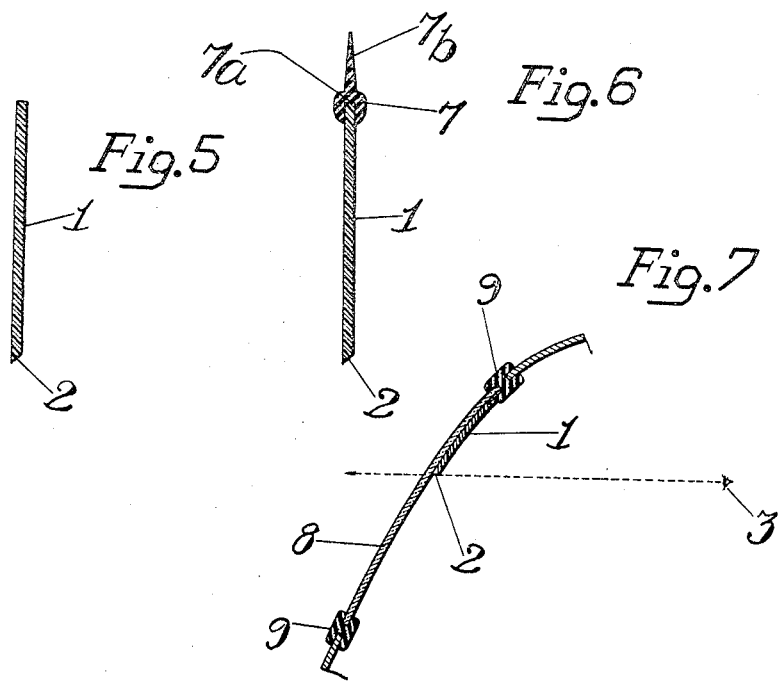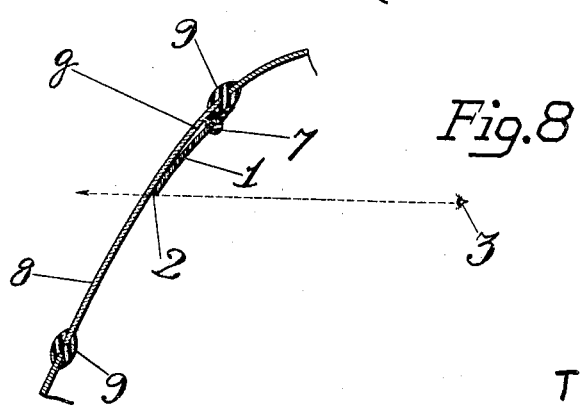

3,489,455
AUTOMOBILE SCREEN FILTER
Takashi Niwa, 2-9-9 Shingashi, Itabashi-ku, Tokyo, Japan
Filed May 5, 1967, Ser. No. 636,486
Claims priority, application Japan, Aug. 29, 1966,
41/80,942; Mar. 20, 1967, 42/22,786
Int. Cl. B60j 3/00
U.S. Cl. 296—97                              2 Claims

ABSTRACT OF THE DISCLOSURE

A filter screen for automobile window glass is formed of an anti-glare type plastic material and its upper and lateral edges are formed to conform to the frame of the window glass. The lower edge of the screen filter is cut obliquely to the surface of the filter contacting the window glass so that it is disposed in a plane corresponding to the plane of vision of a driver as he looks through the window.

SUMMARY OF THE INVENTION

This invention relates to a screen filter for use with an automobile window glass, especially an automobile front window or windshield glass.

It is an object of the present invention to provide a screen filter for an automobile window glass, especially an automobile front window glass, which is so constructed that light can penetrate through it in an optimum state by having the lower edge of the body member of the filter cut obliquely to the face of the body member and positioned in parallel with the orthoptic line of sight of the driver, that is, in exact alignment with a line extending straight from the pupil or eyeball of the driver as he looks forwardly during driving, thereby preventing the formation on the filter of a dark narrow band through which light has difficulty penetrating, such as is encountered in the conventional filter when its lower edge or end face is cut squarely or at right angles with the surface of the filter.

It is another object of the present invention to provide a screen filter for an automobile window glass, especially an automobile front glass, which is fitted along its upper edge and its lateral edges with a rib made from rubber or a like material so that a narrow gap is formed between the adjacent surfaces of the front glass and the body member of the filter. The rib, terminates on the lateral edges adjacent at the lower edge of the filter. This arrangement effectively prevents generation of an annular spectroscopic pattern which looks like an oil stain, such as is encountered in the conventional construction of filters closely fitted in their entirety to the surface of the front glass, the pattern being due to the difference in the index of refraction and the rate of penetration of light resulting from the difference in the materials that make up the glass and the screen filter, and the resultant interruption of sight of the driver.

A further object is to provide a screen filter for use with an automobile window glass, especially an automobile front glass, wherein a rib made from rubber or a like material is provided with a flange which laps over the rubber frame of the front glass when the filter is mounted to the latter. The flange is fitted to the upper and lateral edges of the filter so that it will be viewed as if it were made integral with the rubber frame of the front glass from one and the same material to make for improved outward aspect of the filter when mounted on the window frame and the outward aspect of the filter will not be impaired even when the filter is lowered slightly due to vibrations accompanying the running of the vehicle.

A further object is to provide a screen filter for use with an automobile window glass, especially an automobile front glass, wherein a rib made from rubber or a like material is fitted to the upper edge and both lateral edges of the filter so that, when the filter is mounted onto the upper portion of the front glass, the gap formed between the front glass and the body member of the filter will serve to prevent direct transmission of external heat to the body member of the filter through the window glass and thereby will prevent, as far as is possible, the resulting deflection of the body member of the filter.

With these objects in view and other objects hereinafter set forth, the present invention will now be described in detail with reference to the accompanying drawings showing a preferred embodiment thereof.

In the drawings:

FIG. 4 is a front view showing another embodiment of the screen filter according to the present invention;

FIG. 5 is a cross-sectional view taken on the line V—V of FIG. 3;

FIG. 6 is a cross-sectional view taken on the line VI—VI of FIG. 4;

FIG. 7 is a longitudinal side elevation of the filter of FIG. 3 when mounted on the window frame; and FIG. 8 is a longitudinal side elevation of the filter of FIG. 4 when mounted on the window frame.

Figure 1:
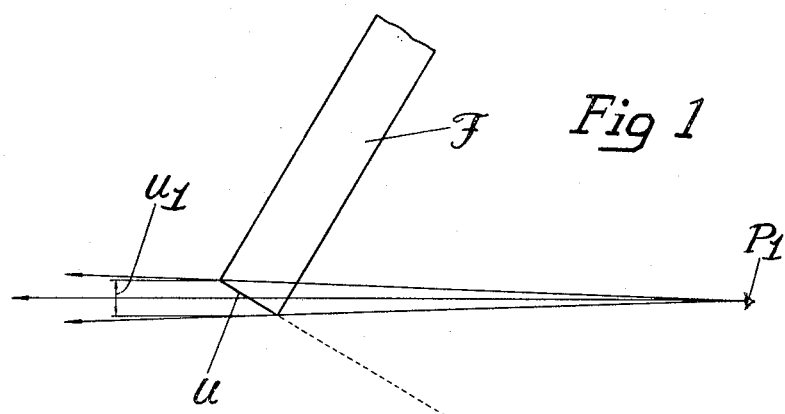
FIG. 1 is an illustrative view showing the conventional screen filter with respect to the line of sight of the driver.

In the case of the conventional screen or antiglare filter, shown in FIG. 1, its lower edge $a$ is cut squarely or at right angles with the filter surface, so that good penetration of light can not be obtained unless the driver's pupil or eyeball $p$ is aligned with the line extended from the lower end face of the filter shown by the dotted line in FIG. 1. If the driver's pupil or eyeball $p$ is located as indicated by $p_1$ the squarely cut lower end face $u$ of the filter will cause a narrow dark band having the width $u_1$ to appear on the surface of the filter. This dark band is difficult to see through and will prove to be a hindrance to the field of vision of the driver. Moreover, it will give occasion to the driver fatigue and may cause accidents. Because of the relative positions of the front glass and the driver's seat, it has been an impossibility in the conventional construction to locate the driver's pupil or eyeball $p$ exactly on the dotted line indicated in FIG. 1.

Figure 2:
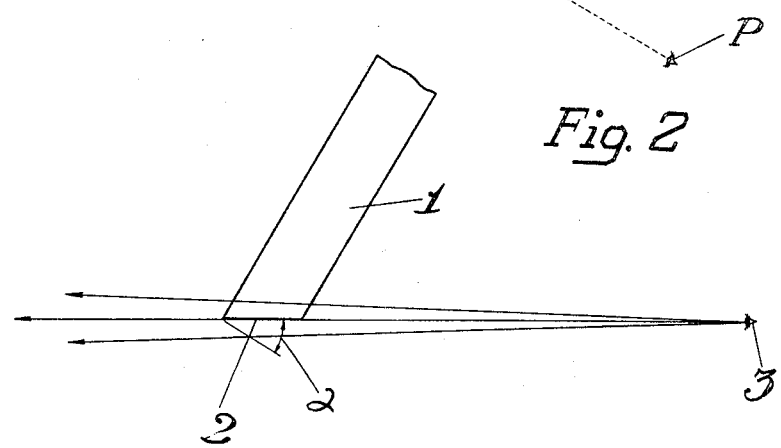
FIG. 2 is an illustrative view showing the present invention screen filter with respect to the line of sight of the driver.

FIG. 2 is an illustrative view showing the basic principle of the arrangement of the screen filter according to the present invention. In this figure, 1 indicates the body member of the screen filter plate made from transparent plastic such as acrylic plastic and its lower edge 2 is cut obliquely to its surface at an angle $\alpha$. This angle $\alpha$ may vary according to the height of the body member 1 of the screen filter, the dimension of the front glass, the height of the driver's seat, the location of the driver's pupil or eyeball which depends upon the driver's sitting position, and so forth, but is so determined that the driver's pupil or eyeball $p$ will be positioned at the same height as the plane of the canted lower edge 2 of the filter, that is, the driver's pupil or eyeball 3 will approximately be at the same height as the line extending from the plane of the canted lower edge 2. As a result, many planes with different angles $\alpha$ may be provided, but a single description will suffice if the body member 1 of the screen filter itself is tiltably or vertically movably mounted relative to the front glass. In this way, as shown diagrammatically in FIG. 2, the formation of a narrow band at the lower edge of the filter which is difficult for the driver to see through may be prevented.

Figure 3:
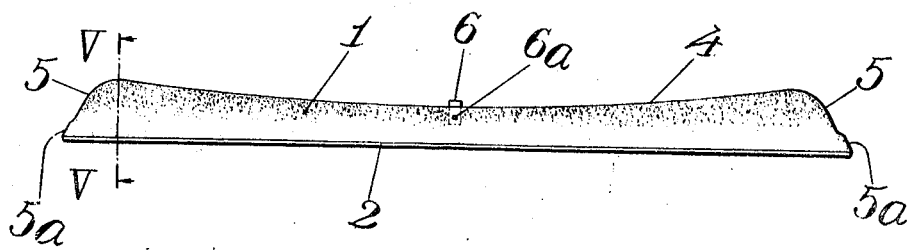
FIG. 3 is a front view showing an embodiment of the screen filter according to the present invention.

FIGS. 3 and 4 show the above-mentioned structure, that is, the body member of the screen filter having a canted lower edge 2 and fashioned, in the shape of an elongated strip, from a transparent plastic, such as acrylic, urea and vinyl plastics. The upper edge 4 and lateral edges 5 of the body member are shaped substantially in the same configuration as the upper edge of the front glass. In case it is needed, an engaging piece 6 is secured by means of a tack 6a to the upper edge 4 and engaging projections 5a are formed along its lateral edges 5 integral with the body member 1.

In FIGS. 4 and 6, there is shown a rib 7 made from rubber and having a groove 7a for engaging the upper edge 4 and both lateral edges 5 of the body member 1. Rib 7 is provided at its top with a flange 7b which narrows gradually towards its uppermost part to form a ridge. Furthermore, the body member 1 is and it is tinted transparent, such as blue, and this color is graded by degrees to lighter tint towards its lower portion.

FIGS. 7 and 8 show the embodiments of the screen filter of the present invention as mounted on the front glass 8 of an automobile. In the embodiment illustrated in FIG. 7, the filter is held inside the window frame 9 made from rubber with the engaging piece 6 and engaging projections 5a fitting into the frame 9, not shown. While the body member 1 of the filter is shown to be fixed closely to the front glass 8, the same may also be mounted with some spacing between it and the front glass 8.

The filter shown in FIG. 8 is held inside the window frame 9 with its projections 5a entering into the frame 9. In this embodiment, the body member 1 of the screen filter is provided with a rib 7 and is not fixed closely to the front glass 8, except at its canted lower edge 2, so that a gap g is formed between the body member 1 and the front glass 8. The flange 7b formed on the rib 7 abuts the window frame 9.

It will be appreciated from the foregoing description of the screen filter according to the present invention that the driver may always see through it in a most appropriate condition.

While the present invention has been described in detail with reference to a preferred embodiment thereof, it is to be noted that the same is not limited thereto but may comprise all other structures coming within the spirit and scope of the invention.

What is claimed is:

1. A screen filter for use with an automobile window glass, especially an automobile front window glass, which consists of a sheet of an antiglare plastic having a curved upper edge, lateral edges extending from both ends of said upper edge and a lower edge extending substantially rectilinearly between the lower ends of said lateral edges said upper and lateral edges each corresponding substantially with the inner contour of the window frame which holds the window glass in place, characterized in that said sheet being held in position facing the window glass with its upper edge and its lateral edges adjacent to the window frame, and the lower edge of said sheet having a flat face extending obliquely to the surface of said sheet contacting the window glass over its entire longitudinal length and being arranged to be disposed in parallel relationship with the line of sight of a driver as he looks through said sheet and window glass, a rib made from rubber or a resilient material and being fitted on and extending along said upper and both lateral edges of the screen filter, said rib extending laterally from the surface of said sheet of plastic and arranged to contact the window glass for spacing said sheet of plastic from the window glass along said upper and lateral edges of the screen filter.

2. A screen filter for use with an automobile window glass, especially an automobile front window glass, which consists of a sheet of an antiglare plastic having a curved upper edge, lateral edges extending from both ends of said upper edge and a lower edge extending substantially rectilinearly between the lower ends of said lateral edges said upper and lateral edges each corresponding substantially with the inner contour of the window frame which holds the window glass in place, characterized in that said sheet being held in position facing the window glass with its upper edge and its lateral edges adjacent to the window frame, and the lower edge of said sheet having a flat face extending obliquely to the surface of said sheet contacting the window glass over its entire longitudinal length and being arranged to be disposed in parallel relationship with the line of sight of a driver as he looks through said sheet and window glass, a rib made from rubber or a resilient material and being fitted on and extending along said upper and both lateral edges of the screen filter, and an elastic flange extending outwardly from said rib in parallel relationship with the plane of said sheet of plastic and arranged to abut the window frame.

References Cited

UNITED STATES PATENTS

| 1,022,789 | 4/1912 | Kight | 351—171 |
| 2,517,609 | 8/1950 | Tillyer | 351—168 |
| 2,546,609 | 3/1951 | Morris | 296—97 |
| 2,590,463 | 3/1952 | Ray | 296—97 |

LEO FRIAGLIA, Primary Examiner

JOHN A. PEKAR, Assistant Examiner

U.S. Cl. X.R.

351—168